United States Patent
Waldmann

(10) Patent No.: US 6,261,459 B1
(45) Date of Patent: Jul. 17, 2001

(54) PROCESS FOR THE ELIMINATION OF LIVESTOCK WASTEWATER ODORS AND WASTEWATER TREATMENT

(75) Inventor: John J. Waldmann, Charlotte, NC (US)

(73) Assignee: Polymer Research Corporation, Charlotte, NC (US)

( * ) Notice: Subject to any disclaimer, the term of this patent is extended or adjusted under 35 U.S.C. 154(b) by 0 days.

(21) Appl. No.: 09/408,834

(22) Filed: Sep. 30, 1999

Related U.S. Application Data

(60) Provisional application No. 60/113,592, filed on Dec. 24, 1998, and provisional application No. 60/113,947, filed on Dec. 24, 1998.

(51) Int. Cl.$^7$ .................................................. C02F 1/56
(52) U.S. Cl. ..................... 210/666; 210/679; 210/694; 210/705; 210/714; 210/725; 210/727; 210/667; 210/728; 210/729; 210/730; 210/734; 210/735; 210/905; 210/916
(58) Field of Search .................................... 210/665–667, 210/679, 705, 714, 724, 725, 726, 727, 728, 729, 730, 734, 735, 905, 916, 694

(56) References Cited

U.S. PATENT DOCUMENTS

| | | | |
|---|---|---|---|
| 4,409,925 | * 10/1983 | Brundrett et al. ..................... 119/1 |
| 4,559,143 | * 12/1985 | Asada et al. ......................... 210/714 |
| 4,744,903 | * 5/1988 | McAninch et al. ................... 210/632 |
| 5,174,903 | * 12/1992 | Miller ................................... 210/725 |
| 5,185,161 | * 2/1993 | Davidson et al. .................... 424/665 |
| 5,186,946 | * 2/1993 | Vallieres .............................. 424/613 |
| 5,238,575 | * 8/1993 | Waldmann ........................... 210/680 |
| 5,393,435 | * 2/1995 | Deans et al. ......................... 210/714 |
| 5,413,720 | * 5/1995 | Miller ................................... 210/725 |
| 5,597,490 | * 1/1997 | Chung et al. ........................ 210/727 |
| 5,807,587 | * 9/1998 | Cox et al. ........................... 424/76.6 |
| 6,132,625 | * 10/2000 | Moffett ................................. 210/727 |

* cited by examiner

*Primary Examiner*—Peter A. Hruskoci
(74) *Attorney, Agent, or Firm*—Isaac Angres

(57) ABSTRACT

An improved process for the treatment of water, selected from livestock wastewater and a livestock water stream, which process comprises adding to said water a composition comprising a sufficient amount of an acid to lower the water pH to less than 3.5 to 2.0; and wherein said acid is selected from the group of 1,3,5-Triazine-2,4,6-(1H,3H,5H)-hydroxyalkyltriglyoxilic acid (PR-1409SA); 2,2-oxy-diacetic acid; 2,2-ether diglycolic acid; sulfamic acid; and sulfuric acid.

18 Claims, No Drawings

PROCESS FOR THE ELIMINATION OF LIVESTOCK WASTEWATER ODORS AND WASTEWATER TREATMENT

This application claims priority to provisional applications 60/113,592 filed Dec. 24, 1998 and 60/113,947 filed Dec. 24, 1998.

BACKGROUND OF THE INVENTION

1. Field of the Invention

The present invention relates to a process for treating livestock wastewater streams, lagoon water systems, sludges, and the like. The treatment contemplated by this invention is particularly applicable to wastes derived from slaughterhouses, fancy meat departments, and tank houses. The instant method is particularly applicable for reducing odors and contaminants from multi-animal wastewater sources. Current government regulations require that such waste contaminants must be removed from the wastewater, or collected in storage so as to be in compliance with the regulations. The Environmental Protection Agency (EPA) has recently issued very stringent effluent guidelines and standards for hog and poultry industries in particular.

The food processing industries such as the hog industry, poultry industry, slaughter-houses, fish meal factories and bone meal factories typically consume large quantities of water in the various processing segments of their plants, which water is then discharged as wastewater. This water and/or wastewater, contains large quantities of fats and oils, fatty acids, proteinaceous material, blood, and other undesirable solids.

The large amounts of blood, fats and oils, proteinaceous materials and dissolved organic material raise the total ammonia and nitrogen content of the water, thereby increasing the level of stench and the septicity of the animal waste. Therefore the water used in the various plants sections becomes contaminated with a number of obnoxious substances. The effluent may vary in composition but typical effluent from an abattoir, hog farm or poultry processing plant contains appreciable amounts of blood proteins, soluble protein from muscle and tissues, suspended or colloidal protein material, fragmented tissue and fat.

At the present time most of the effluents from animal waste derived from farms or slaughterhouses are usually treated by microbiological methods (i.e., both aerobic and anaerobic) in holding tanks. The two disadvantages of this method are that a large area of ground is required for the equipment and the processing area holding tanks and that the process destroys the potentially valuable proteins. The result is generally foul smelling wastewater that has over 1,000 parts per million (ppm) of total ammonia, over 1,000 ppm of total nitrogen, over 100,000 mg./l. Biological Oxygen Demand (BOD), over 200,000 ppm Chemical Oxygen Demand (COD), over 50,000 ppm of Total Suspended Solids (TSS), and over 30,000 ppm of Oil and Grease (O&G). These levels may vary from plant to plant.

2. Description of the Prior Art

The patent literature reveals that a number of systems have been proposed for clarification of industrial waste effluent of various types of animal waste. For example, in U.S. Pat. No. 5,807,587, Cox et. al. disclose a composition and method for preventing and/or reducing stench and septicity from animal waste comprising the use of a sulfur and oxygen-bearing component, one or more aldehydes (e.g. formaldehyde) and/or one or more ketones, and surfactant. The use of such compositions has serious impact on threshold limits. The aldehyde and ketone vapors and/or mist are intensely irritating agents to humans and contribute to increases in the COD and BOD levels. The disclosure of U.S. Pat. No. 5,807,587 is incorporated herein by reference.

Miller in U.S. Pat. No. 5,174,903 teaches a process for the recovery of proteinaceous materials, fats and oils from wastewater by using lignin as coagulant, a natural polymer polysaccharide such as carboxymethylhydroxypropyl substituted guar gums, synthetic polymer, and chlorine gas or sodium hypochlorite. The chlorine or sodium hypochlorite alone in such as process facilitates the formation of toxic chloroamines, increases the threshold limits, and does not solve the problem of high level effluent purification with the elimination of the high percentage of ammonia (NH3-N). The '903 patent relates in particular to protein recovery. It also does not solve the problems of treating and/or removing contaminants from the wastewater stream which will be discharged. The '903 patent disclosure is incorporate herein by reference.

Waldmann in U.S. Pat. No. 5,238,575 (Filed Feb. 4, 1991) describes the use of an siliceous vulco clay modified by a hydrophobic long chain alkyl (C12–C24, preferably >C16) amines protonized by an aliphatic acid (C1–18) to remove odor and liquid hydrocarbon contaminants in a water stream. The described chemical absorbents comprises products of a formula of $A_m B_n C_p$ wherein A, B and C are an siliceous volclay, or attapulgite clay, a hydrous silicate of aluminum generated from sodium bentonite or calcium bentonite, or monmorillonite bentonite, a modified aminoplast resin, and a siliceous support-modified hydrophobic material respectively. The '575 disclosure is incorporated herein by reference.

An aspect of the present invention is that other organophilic clay which may be employed are primary, secondary, tertiary, and quaternary substituted ammonium salts of montmorillonite, hectorite, attapulgite, sepiolite, and smectite in which the substituted ammonium cation or phosphonium cation contains at least one carbon chain of 12 or more carbon atoms in length. These organoclays are used in general as thickener agents. The chemically modified forms of the present invention are well-known materials and commercially available. Preferred are the powder forms with smaller particles having low density (Specific Gravity), preferably less than one (1), for use at from 1% to 15% by weight of the wastewater contaminant solids.

Example of the technologies using water-swellable clays are disclosed in the:

U.S. Pat. No. 5,401,418 issued to Boyd (filed Aug. 10, 1993)

U.S. Pat. No. 5,302,570 issued to Newman (filed Nov. 2, 1992)

U.S. Pat. No. 5,266,208 issued to Stahley, et. al. (filed May 29, 1992)

U.S. Pat. No. 5,268,109 issued to Boyd (filed Mar. 15, 1993)

U.S. Pat. No. 5,151,155 issued to Cody, et. al.(filed May 9, 1991)

U.S. Pat. No. 4,517,094 issued to Beall (filed Jun. 28, 1983)

U.S. Pat. No. 4,287,086 issued to Finlayson, et. al. (filed Dec. 10, 1976)

U.S. Pat. No. 4,105,578 issued to Finlayson, et. al. (filed Feb. 23, 1977)

U.S. Pat. No. 3,974,125 issued to Oswald, et. al. (filed Sep. 27, 1974)

U.S. Pat. No. 3,422,185 issued to Kuritzef

U.S. Pat. No. 2,966,506 issued to Jordan

These references relate to the well-known art of organoclays having the Specific Gravity range of 1.2 to 2.5. None of these aforementioned references teach or suggest the use of organoclays to remove contaminants and odor from livestock wastewater nor from livestock water streams. In contrast, the organoclays in the present invention act as absorbents, and adsorbants provide assistance to the coagulation system used, act as neutralizing charged density agents, and act as precipitating agents of the contaminated matter. These above listed patents are incorporated herein by reference.

In U.S. Pat. No. 5,795,480 (filed Dec. 30, 1996) Keun, et. al. teach a method and system for the treatment of the livestock wastewater by a biodegradation. The '480 disclosure is incorporated herein by reference.

In U.S. Pat. No. 4,409,925 Brundrett, et. al. describe an absorbent suitable for a wide variety of uses including for selective absorption of water or animal waste. The absorbent usually consists of Plaster of Paris in combination with other components. The '925 disclosure does not teach or suggest the use of the absorbent to suppress odor or treat livestock wastewater. The '925 disclosure is incorporated herein by reference.

O'Neill, et. al., in U.S. Pat. No. 3,966,450 teach controlling the odor of animal waste slurry by contacting the waste slurry with hydrogen peroxide, adjusting the pH with a mineral acid, and mixing the slurry until the odor in no longer objectionable. The '450 disclosure is incorporate herein by reference.

Cox, et. al., in U.S. Pat. Nos. 5,609,863 and 5,807,587 disclose compositions and methods for reducing odor and septicity by use of one or more aldehydes and/or one or more ketones along with other compounds. '587 also discloses the use of a sulfur and oxygen bearing component which is selected from the group of sulfites, metabisulfites, lithium hydrosulfite, and the like. Neither '863 nor '587 teach or suggest that the methods described eliminate the water contaminants. The disclosures of '869 and '587 are incorporated herein by reference.

SUMMARY AND OBJECT OF THE INVENTION

The present invention discloses a chemical composition and method of treating livestock wastewater or wastewater streams and associated odor. The livestock wastewater, wastewater stream and odor contain a variety of chemical constituents including highly nutritive salts such as nitrogen (NH4-N) and phosphorous (PO4-P), protein, oil and grease, and suspended solids including skatole waste. More particularly, this invention relates to the use of a combination of a clay with the highly synergetic effect of double quaternary ammonium compounds. The clay is selected from the group of ammonium bentonite organoclays, hectorite cationic clays such as Hectalite, siliceous vulco clays (CS-50), non-blue bentonites, and sodium bentonite clays. The new protonizing agents used in this invention are di- or bis-carboxylic, polycarboxylic, or chemically modified di- or polycarboxylic acids. Preferred compounds include bis (carboxymethyl)ether; acetic acid; 2,2'-oxybis- or 2,2,'-oxy-diacetic acid, oxydiethanolic acid, or diglycolic acid (hereinafter 2,2,'DGA, CAS# 110-99-6; (HOOC—CH$_2$)$_2$O, other multifunctional acids; mixtures of these acids; or 1,3,5-Triazine-2,4,6-(1H, 3H, 5H)-hydroxyalkyltriglyoxilic acid (known to be an odor suppressant, chelating agent, and coagulation aid).

These multiple carboxylic acids will react by protonizing the primary or secondary long chain alkyl amine. They are preferably C$_4$–C$_{60}$ in order to form a bridge linking the organic chain hydrocarbon and the clay. The following illustrate this concept:

1. 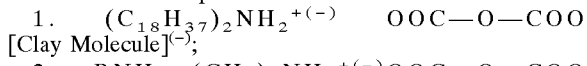

2. 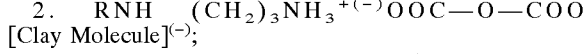

3. Dihydrogenated tallow amine, 2HT (CAS# 61789-79-5)+2,2DGA; hydrogenated tallow diamine, (e.g. tallow-1,3-propanediamine, CAS# 61791-55-7)+2,2DGA; a blend of these protonized amines with one or more of the above listed clay molecules; or a blend of these with other organic modified clay molecules.

4. An organic clay from Hectalite, or Bentonite, or Hectorite, or Hectorite-Bentonite mixtures, modified with methyl-dihydrogenated tallow-amine, M2HT (CAS# 61788-63-4) and with a quaternary ammonium compound selected from the group of N,N,N,N,N,-Pentamethyl-N,-Tallow alkyl-trimethylene-dichlorides having the general structure (CAS# 68607-29-4) of:

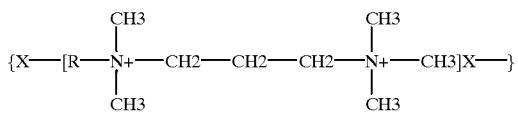

X = chloride
R = aliphatic tallow radical or DM2Coco ammonium chloride (CAS# 61788-62-3) with Pentamethyl-N-Tallow alkyl-trimethylene-dichloride (CAS# 68607-29-4). These latter useful combinations are available in the weight ratio of 1.557:1.000 from Polymer Research Corporation as MS-0298MF19, MS-0298WW and MS-0298MF16.

5. A combination of siliceous vulco clay montmorillonite and a quaternary ammonium chloride such as the ammonium chloride salts of methyl-dihydrogenated tallow-amine, M2HT (CAS# 61788-63-4); or dihydrogenated tallow amine 2HT(CAS#61789-70-5) tallow-1,3-propanediamine, DT (CAS# 61791-55-7); and dihydrogenated-tallow-amine, 2HT (CAS# 61789-79-5) in the weight ratio of (4.196:1:1) and protonized by organic diacids such as 2,2,oxy-diacetic acid; (HOOC—CH$_2$)$_2$O; or 2,2DGA (available from Polymer Research Corporation as MS-0298M).

6. A combination of vulco clays high swelling sodium bentonite ammonium modified by a combination of ammonium salts of methyl dihydrogenated tallow amine, M2HT (CAS#61788-63-4); tallow-1,3-propanediamine (CAS#61791-55-7); and dihydrogenatedtallowamine, 2HT (CAS# 61789-70-5) in the weight ratio of vulco clay (CS-50) to combined amines of 2.987:1.000 (or 3:1) and with a respective amine weight ratio of 3.846:1.000:1.000. This combination is protonized by both glacial acetic acid and hydroxy glycolic acid in the weight percent ratio of combined amines to acids of 2.088:1.000. An aqueous form of this combination with a weight percent ratio of water to all organic matter to clay of 91.850:2.697:5.449(CS-50) is available from Polymer Research Corporation as MS-0893FMD.

7. A sodium bentonite clay treated with a composition of the dual quaternary ammonium salts consisting of dimethyl-dihydrogenated ammonium chloride, DMHT (CAS#61789-80-8) and dimethyl-octadecylbenzyl ammonium chloride, DMHT-B (CAS#61789-72-8) in the weight ratio of 3:1 ammonium chlorides to clay.

8. Organoclay complexes based on strong synergetic combinations of sodium hectorite clay with very high cationic exchange capacity (120 meq/g) or Black Hills Bentonite (a sodium bentonite clay) modified by methyl dihydrogenated tallow amine, M2HT (CAS# 61788-63-4) protonized by 2,2,-oxy- diacetic acid or diglycolic acid (2,2DGA); tallow-1,3-propane diamine, DT (CAS# 61791-55-7); and dihydrogenated-tallowamine, 2HT (CAS# 61789-79-5), or N,N,N,N,N-Pentamethyl-N-Tallowalkyl trimethylene dichloride (CAS#68607-29-4) in a weight ratio of 3.846:1:1 (available from Polymer Research Corporation as MS-0298F19C, MS-0298WW). This combination has an increased adsorption of crude oil on the surface of water or from a soil surface by 45%–50% to 121%–132% VS. The products affiliate to the composition described by the '575 patent of a complex protonized mixed amine combination of HPT (CAS# 61788-45-2); T (CAS#61790-33-8); and 1,3 propane-N-tallow-diamine, DT (CAS# 61791-55-7) protonized by a glacial acetic and glycolic acid mixture (available from Maxichem Inc as MS-0893, MS-0893DT).

9. An organic complex based on the use of a mixture of high cation exchange hectorite clay (122 meq/g, or 18 parts by weight) with the [low swelling] sodium bentonite vulco clay, [CS-50] (32 parts by weight) reacted with the ammonium chloride salt of methyl-dihydrogenated-tallowamine, M2HT; dihydrogenatedtallowamine, 2HT; and tallow-1, 3-propane diamine (CAS# 61791-55-7) in the weight ratio of 2.460:1.000:1.523 protonized with 2,2DGA. This protonized amine mixture complex gives a light green product with very fast dewatering properties which is very easy to handle and crush. This product is available from Polymer Research Corporation as MS-0298F19E$_5$ or MS-0298WW.

The components of the present inventive composition are readily available. Hence the inventive method of modification of clays can be used with known quaternary ammonium clays. For example, quaternary ammonium clays [N(+)R$_{1,2,3,4}$] (Cl$^{31}$) (as described in the '086 patent), such as the Bentone 34 or Claytone 34 (designated trade names) which are rheological modifiers available from NL Industries or from Laporte Industry, can be modified according to this invention with dihydrogenated-tallowamine, (2HT), and protonized with 2,2DGA available from Maxichem Inc as MS-0298E$_2$.

The modified organic clays described above are used for livestock water treatment. They may be combined with flocculants or coagulants such as but not limited to: aluminum oxysulfate [AOS; Al$_2$O(SO$_4$)$_2$]; a mixture of AOS with aluminum sulfate; aluminum sulfate; aluminum or iron hydroxy chlorides, silicates, or sulfates such as Al$_2$(SO$_4$)Cl$_2$(OH)$_2$(H$_2$O)$_6$ (MAXIFLOC-AC-60); di-ferric chloride sulfate (Fe$_2$Cl$_4$SO$_4$ MAXIFLOC-FC60); calcium or magnesium derivatives of the aforementioned compounds; other compounds described in U.S. Pat. Nos. 4,566,986, Re. 34,486 and 5,238,575 (Waldmann); flocculants consisting of polydiallyldimethylammoniumchloride (PDADMAC, 90% active); cationic, anionic, or nonionic polyacrylamide compounds with a viscosity average molecular weight in range from 10,000 to 25,000,000; a non-blue bentonite; modified diatomaceous earth; modified fuller's earth and other clays which have practically no gel forming properties; highly colloidal clay and/or activated carbon; in special AC from wood sources, or AC activate surface area by inorganic acid or combinations of the aforementioned compounds with water soluble cationic polyguanidine amines (sold by Maxichem and Polymer Research Corporation as MC-1012, MAXIFLOC-8200 and 8200I, PR-6100), water soluble cationic polymelamine (MC-901, MC-902), or a mixture of these amines also available from Maxichem, Inc. Very highly charged hectorite clay (120 to 140 meq/g) or a high cation exchanged sodium bentonite (known as Black Hills Bentonite clays) are useful in the present invention and have the principal chemical compositions of:

|  | Hectorite clay | Black Hills Sodium Bentonite |
|---|---|---|
| SiO$_2$ | 45.0% | 65.0% |
| Al$_2$O$_3$ | 6.56 | 20.20 |
| MgO | 14.4 | 1.00 |
| CaO | 9.54 | 1.40 |
| Na$_2$O | 2.55 | 3.10 |
| K$_2$O | 1.28 | 0.80 |
| Fe$_2$O$_3$ | 1.67 | 2.30 |
| TiO$_2$ | 0.35 | 0.10 |
| LOI | 18.65 | 7.00 |
| pH (2% dispersion) | 9.5–10.5 | 8.4 |

Organic modified clay products of the present invention using hectorite, a very high cation exchanged clay (122 meq/g), or hectorite clay and high swelling sodium bentonite clay mixture or sodium bentonite are highly charged with a combination of methyl-dihydrogenated-tallowamine, tallow-1,3-propanediamine and dihydrogenated-tallowamine protonized by 2,2DGA in the weight ratio of 4.196:1.000:1.000, clay:amines:protonizing agent. Such protonized amine combinations are available from Polymer Research Corporation (e.g. MS-0298WW, MS-0298M).

Another embodiment of the present invention is to use a mixture of organic modified cationic hectorite (very high cation charged clay (120 meq/g) with sodium, or calcium bentonite, bentonite vulco clay a hydrous silicate of aluminum modified with a mixture of primary tallow amine, T, (Adogen 170); hydrogenated tallow amine, HT, (CAS#61788-45-2, Adogen 140); and hydrogenated tallow-N-1,3-propanediamine (Adogen 540 by Witco Corp.) and protonized by an organic polyacids mixture of 2,2,-oxydiacetic acid [CAS#110-99-6] and 2,2DGA, as well as by an 1,3,5-Triazine-2,4,6-(1H,3H,5H)-hydroxyalkyltriglyoxilic acid of the following formula:

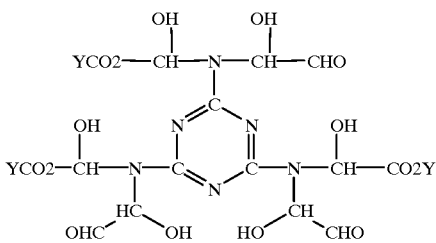

where Y = H, Na, NH4, ½(Ca, Mg or Zn), or a mixture of these

Compounds of this formula are available from Polymer Research Corporation under the Trade Names of PR-1406AS and PR-1406NA.

A further embodiment of the present invention is to use an organic cationic non-blue bentonite, sodium bentonite, sodium vulco bentonite, or hectorite clay, mentioned above, blended with modified cellulose fiber having a defined chemical distribution of:

| Cellulose | 38% | Lignin | 18% |
|---|---|---|---|
| Pectin | 33% | Protein substances | 11% | or with a brown cellulose hydrophobic material sold by Polymer Research Corporation as MC-01X[A] or MC-02X

[A] according to size, MC-03X (hydrophobic brown cellulose), MC-04X (with adipoguanamine silicon surface modified) and MC-05X (with polymethylene-urea silicon surface modified).

A further embodiment of the present invention is based on the discovery of strong synergism in certain combinations described in the following:

1. A mixture of an aliphatic amine acetate (CAS# 61790-59-8) with methyl-dihydrogenated-tallow ammonium chloride and tallow amine (T) protonized by 2,2DGA (designated as Product A);

2. A hydrous silicate of aluminum modified by reactions with the combination of methyl-dihydrogenated tallow amine, N-tallow- 1,3-propanediamine, and primary tallow amine protonized by 2,2DGA and the MC-02XA clay-cellulose blend in the weight ratio of 4.196:1:1:5.594 (available from Polymer Research Corporation as MS-0298F17);

3. A modified organic clay modified by the combination of dimethyl-dihydrogenated-tallow ammonium chloride and tallow-1,3-propane diamine protonized by 2,2DGA and the MC-01X[A] clay-cellulose natural fiber blend (available from Polymer Research Corporation as MS-0298MDF19); and 4. A clay modified by the combination of dimethyl-dicoco ammonium chloride (DM2Coco, CAS#61788-62-3), tallow amine acetate and N-tallow-1,3propane diamine protonized by (2,2DGA) and the MC-03XA clay-cellulose blend (available from Polymer Research Corporation as MS-0298MDF11 and MS-0298MDF15).

5. A organic clay of hydrous silicate of aluminum mixture (high swelling sodium bentonite-hectolite clays in the percentage weight ratio (1-99:99-1) is (modified by the combination of methyldihydrogenated tallow amine M2ht (CAS#61788-63-4), or dihydrogenated tallow amine 2HT (CAS#61789-70-5). These are available from Polymer Reaserch Corp. (e.g. MS-8920F19A and 19B)

6. A organic clay of a hydrous silicate of aluminum mixture of calcium bentonite and sodium bentonite in the weight ratio of (0.5-4.5:4.5-0.5) is modified by the combination of dihydrogenated tallowamine 2HT (CAS#61789-79-5) with/or without N,N,N,N,N-Pentamethyl-N-talowalkyl-trimethylene dichloride, (CAS#68607-29-4) and natural cellulose fiber (0–99% by weight). These are available from Polymer Reaserch Corp. (e.g. MS-8920F19C and 19D).

7. An organic clay of a hydrous silicate of aluminum mixture of hectolite and sodium bentonite (MS-8920F19C) fine powder (0.47%–4.30% by wt.) is modified by a mixture with calcium sulfate hemihydrate (66.35%–57.14% by wt.), natural cellulose fiber (4.74%–0.47% by wt.) and water (28.44%–38.09% by wt.). These are available from Maxichem, Inc (e.g. MS-920F19CAS).

Another embodiment of the present invention is the modification of sodium bentonite clay by an organic acid mixture of an acetate of primary tallow amine, N-tallow-1,3propane diamine protonized by 2,2DGA, monohydrogenated tallow amine and the clay natural fiber blend of MC-04X or of MC-05X in a weight ratio of 1.496:1:2.22:5.926 (available from Polymer Research Corporation as MS-0298F9 or MS-0298F10).

Products useful in the present invention as adsorption/coagulant additives include the following diatomaceous earth products (available from Polymer Reassert Corporation). The following table gives the approximate chemical analyses in percent by weight for PR-110, PR-110A, PR-110B and PR-110C:

|  | PR-110 | PR-110A | PR-110B | PR-110C |
|---|---|---|---|---|
| $SiO_2$ | 88–91% | 45.00% | 49.70% | 63.85% |
| $Al_2O_3$ | 3–4 | 6.56 | 1.80 | 10.07 |
| $Fe_2O_3$ | 1.1–1.5 | 1.67 | 0.51 | 2.83 |
| $P_2O_5$ | 0.1–0.2 | 0.00 | 0.00 | 0.00 |
| $TiO_2$ | 0.1–0.2 | 0.35 | 0.17 | 0.44 |
| CaO | 0.3–0.6 | 9.54 | 3.76 | 7.41 |
| MgO | 0.4–1.0 | 14.4 | 23.30 | 3.34 |
| $Na_2O + K2O$ | 3.0–3.6 | 3.83 | 3.57 | 0.33 |
| $Fe_2O_3$ | 0.00 | 1.67 | 0.51 | 0.00 |
| FeO | 0.00 | 0.00 | 0.11 | 0.00 |
| LOI | to 100.0 | 18.65 | 16.20 | 6 |

VS high swelling sodium vulco bentonite which contains over 90% Montmorillonite clay has a typical analysis of CS-50 as follows:

| | |
|---|---|
| $SiO_2$ | 53.02% |
| $Al_2O_3$ | 21.08 |
| $Fe_2O_3$ | 3.25 |
| FeO | 0.35 |
| MgO | 2.67 |
| Na and K | 2.57 as $Na_2O$ |
| CaO | 0.65 |
| Crystal water ($H_2O$) | 5.64 |
| Trace elements | 0.72 |

Alternatively, such clays can be described by the following formulae wherein the PR-110B clay is more refined than the PR-110A which is colloidal clay:

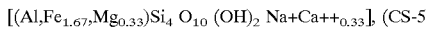

[(Al,Fe$_{1.67}$,Mg$_{0.33}$)Si$_4$ O$_{10}$ (OH)$_2$ Na+Ca++$_{0.33}$], (CS-50)

[(Al$_{0.1}$Li$_{0.30}$Mg$_{2.67}$Si$_4$ O$_{10}$(OH)$_2$Na$^+$Ca$^{++}$$_{0.30}$)], (PR-110A)

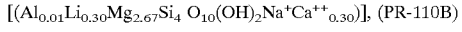

[(Al$_{0.01}$Li$_{0.30}$Mg$_{2.67}$Si$_4$ O$_{10}$(OH)$_2$Na$^+$Ca$^{++}$$_{0.30}$)], (PR-110B)

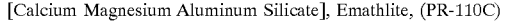

[Calcium Magnesium Aluminum Silicate], Emathlite, (PR-110C)

The above clays are useful in combination with other products in formulations to treat livestock wastewater.

The livestock wastewater treatment process of the present invention comprises the following sequential steps:

1. Adusting the pH of waterstream to 3 or less than 3 with 1,3,5-Triazine-2,4,6-(1H,3H,5H)-hydroxyalkyl tri glyoxilic acid (PR-1400AS), or 2,2,-oxyacetic acid, or sulfamic acid, or sulfuric acid to form multiple suspended solid salt products;

2. Adding the aluminum oxysulfate (AOS), and/or other hydroxychloro compounds mentioned above (MAXIFLOC-AC 60 or FC-60) along with calcium chloride as a co-catalyst;

3. Separating out the sludge,

4. Readjusting the water pH with an alkaline material, preferable lime, or quick lime pozzalime, calcium aluminate, or sodium aluminate, sodium or calcium silicate or meta silicate, calcium oxide, or calcium hypochlorite, or calcium carbonate, or a mixture of these;

5. Adding a cationic polyamine, preferably of low molecular weight (1,000 to 10,000) available from Maxichem under trade names of MC-1200, MC-901, MC-902, PR-6100);

6. Adjusting the floc size (if needed) by adding 0.1% (dil. 0.1:10 water ratio) of a cationic, anionic, or nonionic polymer; of polyacrylamide copolymers; or of polydiallyldimethylammoniumchloride (poly-DADMAC, 90% active);

7. Separating the solids formed by filtration or air flotation;

8. Mixing the supernate with organic modified cationic clay, preferably PR-0298MF19 followed by mixing with activated carbon (AC), Lignin, or Anthracite; and 9. Separating or filtering the mix to give discharged water. This process can be modified by combining the steps 2 to 9 as one (1) step by adding a combination of coagulant flocculant-absorbent commercially available from Polymer Research Corp. (e.g. trade name products of MS-0298M2, MS-0298M3, or MS-0298M4). The treatment process can last for an average time in the range of from 1 to 60 minutes.

The composition for carrying out the present invention comprises:

(a) from 1 to 40 parts by weight (pbw) of acid;

(b) from 0.5 to 20 parts of a coagulant selected from the group consisting of inorganic coagulants and inorganic flocculant-coagulants;

(c) from 1 to 10 parts of an alkaline compound;

(d) from 1 to 6 parts of a water soluble amine selected from the group consisting of water soluble polyguanidine resins, water soluble of polymelamine resins, water soluble cationic alkyl polyamines, water soluble alkyl polyamines, polyethyleneimines, mixtures of two or more of these amines, and mixtures of one or more of these amines with one or more water soluble inorganic coagulants;

(e) from 2 to 50 parts of one or more organic modified clay; and mixtures thereof; and (f) from 0.5 to 10 parts of an organic flocculant selected from the group consisting of: polydiallyldimethylammonium chloride (PDADMAC), cationic copolymers of acrylamide, anionic copolymers of acrylamide, nonionic copolymers of acrylamide, and mixtures thereof; wherein said organic flocculant has a Viscosity Molecular Weight range of from 10,000 to 30,000,000.

A typical example of the operation of the process according to the present invention follows. This example is set for the general procedure in a major Hog Industrial Plant water treatment using a preferred composition described in Table 1 and prepared in accordance with the present invention.

TABLE 1

| Component | parts by wt |
| --- | --- |
| PR-1400AS | 5 |
| MC-046 (AOS (5%) + Alum (95%)) | 2 |
| MAXIFLOC AC-60 (and Calcium Chloride coagulants (1:1 mixture) | 1.5 |
| Calcium aluminate | 0.6 |
| PR-0298M2 | 5 |
| Hydrated Lime | 10 |
| Calcium Oxide | 5 |
| PR-110C | 5 |
| PR-0298M (organic clay modified and described above) | 35 |

The fully mixed and prepared above composition in Table 1 is for use at 2.0 grams/L to treat the hog wastewater farm plant having the contaminants described below in Table 2.

TABLE NO. 2

| 1. Ammonia (NH3-N) | 24,900 mg/L |
| --- | --- |
| 2. Nitrogen (TKN) | 25,160 mg/L |
| 3. Phosphorous-PO4 | 985 mg/L |

Samples of the wastewater were mixed for 4, 6, and 8 minutes respectively for Tests # 1–3 and allowed to settle. They were then filtered. The filtrates were treated with PR-0298MF19 (5 g/L) (modified organic clay described above) and then tested for the three major contaminants shown in Table 2. The percentages of contaminant removal are given in Table 3.

TABLE 3

| | Constituent | | | | | |
| --- | --- | --- | --- | --- | --- | --- |
| | Test #1 Reduction | | Test #2 Reduction | | Test #3 Reduction | |
| | (mg/L) | (%) | (mg/L) | (%) | (mg/L) | (%) |
| Ammonia | 743 | 97.0 | 712 | 97.1 | 647 | 97.4 |
| Nitrogen | 1081 | 95.7 | 879 | 96.5 | 819 | 96.7 |
| Phosphorous | 2.75 | 99.72 | 1.90 | 99.81 | 1.85 | 99.82 |

The wastewater treatment was also evaluated based on the Oil & Grease (O&G; extractable organic mg/L) by using a composition with different absorbents than those presented above. Results are given in Table 4 according to the different absorbent tested.

TABLE NO.4

| Sample Treatment Composition | Amount of Composition (g/L) | Extractable Organic (mg/L) | Test Reduction (%) |
| --- | --- | --- | --- |
| Untreated sample | — | 7,800 | 0 |
| MS-0893 | 5 | 600 | 92.31 |
| MS-0893FMD | 5 | 185 | 97.63 |
| MS-0298M | 5 | 117 | 98.50 |
| MS-0298MF19 | 5 | 30 | 99.62 |
| MS-0298F19D | 5 | 43 | 99.55 |
| MS-0298F19E2 | 5 | 20 | 99.74 |
| MS-0298WW | 5 | 15 | 99.81 |
| Product (A) | 5 | 17 | 99.78 |
| Bentolite WT* | 5 | 4500 | 42.30 |
| Accofloc SDG** | 5 | 2000 | 74.36 |
| Bentone 34 | 5 | 1950 | 75.00 |
| MS-0298E$_2$ | 5 | 1200 | 84.62 |
| MS-8920CAS | 5 | 10 | 99.87 |

*Laporte Industries (organic bentonite modified clay)
**Colloid Environmental Technology Div. Of American Colloid Company The results indicated that over 98.5% of organic contaminates are removed by the new organically modified clays of the present invention, as described above, in combination with inorganic coagulants and adsorbent coagulants as described according to this invention, and in use according to the proposed inventive process of treatment for livestock wastewaters.

It is to be understood that the forms of the invention herewith described are to be taken as preferred examples of the same, and that various changes may be resorted to, without departing from the spirit of the invention or the scope of the subjoined claims.

What is claimed is:

1. An improved process for the decontamination and deodorization of waste waters selected from the group consisting of: livestock wastewaters, slaughterhouses waste waters and livestock lagoon water streams, which process comprises adding to said waste waters a composition comprising a sufficient amount of an acid to lower the water pH to 3.0 or less than 3.0; and wherein said acid is selected from the group consisting of a 1,3,5-Triazine-2,4,6-(1H,3H,5H)-hydroxyalkyltriglyoxilic acid of the formula

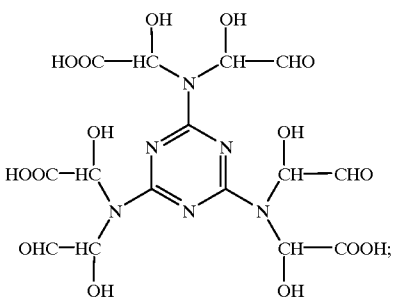

2,2-ether diglycolic acid, and sulfamic acid, wherein said composition comprises: (a) from 1 to 40 parts by weight (pbw) of said acid; (b) from 0.5 to 20 parts of a coagulant selected from the group consisting of inorganic coagulants and inorganic flocculant-coagulants; (c) from 1 to 10 parts of an alkaline compound; (d) from 1 to 6 parts of a water soluble amine selected from the group consisting of water soluble polyguanidine resins, water soluble polymelamine resins, water soluble cationic alkyl polyamines, water soluble alkyl polyamines, polyethyleneimines, mixtures of two or more of these amines, and mixtures of one or more of these amines with one or more water soluble inorganic coagulants; (e) from 2 to 50 parts of one or more organic modified clay; and (f) from 0.5 to 10 parts of an organic flocculant selected from the group consisting of: polydiallyldimethylammonium chloride (PDADMAC), cationic copolymers of acrylamide, anionic copolymers of acrylamide, nonionic copolymers of acrylamide, and mixtures thereof; wherein said organic flocculant has a Viscosity Molecular Weight range of from 10,000 to 30,000,000.

2. A process according to claim 1 which further comprises the steps of:

(a) mixing to get uniform pH throughout the water;
(b) adding to said water a sufficient amount of a compound selected from the group consisting of: aluminum oxysulfate, aluminum sulfate, hydroxyaluminumchlorosulfate and ferricdichlorosulfate; hydroxyaluminum chlorosilicate;
(c) adding to said water a sufficient amount of calcium chloride;
(d) mixing said water thoroughly;
(e) separating the coagulated solids from said water by a process selected from the group consisting of filtration, and air flotation;
(f) mixing in said water a sufficient amount of an alkaline additive to bring the pH to be in a range of 10 to 11.5;
(g) mixing in said water a water soluble amine selected from water soluble polyamino guanidine and water soluble polyamino melamine;
(h) mixing in said water an acid to achieve a pH of 7–8 to produce solids;
(i) separating out from said water the solids formed by filtration, or gravity separation to clarify said water;
(j) mixing in said water an organic modified clay made by reacting clay with an amine selected from the group consisting of protonized primary amines, protonized secondary amines, protonized tertiary amines, and quaternary ammonium compounds;
(k) mixing in said water calcium aluminum magnesium silicate;
(l) optionally adding to said water at least one flocculant to form a flock, wherein said flocculant is selected from the group of anionic flocculants, cationic flocculants, and non ionic flocculants; and
(m) separating said flock out from contaminant-free water by a method selected from the group consisting of filtering, and gravity separation.

3. A process according to claim 2 wherein said alkaline compound is selected from the group consisting of: calcium hydroxide, calcium oxide, sodium aluminate, calcium aluminate, calcium carbonate, sodium silicate or metasilicate and combinations of two or more said compounds.

4. A process according to claim 2 wherein said amine is selected from the group consisting of: methyl dihydrogenated tallow ammonium chloride, dimethyl dihydrogenated tallow ammonium chloride, dimethyl dihydrogenated dicoco ammonium chloride, dimethyl ($C_{12}$–$C_{17}$) alkyl ammonium chlorides, N,N,N,N,N-pentamethyl-N-Tallowalkyl-trimethylene-dichlorides, benzyl ammoniumorgano clays, N-Alkyl-1,3-propane fatty diamines, ether diamines, ($C_8$–$C_{23}$) tertiary amines, dihydrogenated tallow amine and mixtures thereof.

5. A process according to claim 4 which further comprises the step of treating said water with a member selected from the group consisting of activated carbon, charcoal, lignin and mixtures thereof.

6. A process according to claim 5 wherein said compound is mixed with one or more of said amines modified clays or organic clays.

7. A process according to claim 2 wherein said organic modified clay comprises one or more clays reacted with one or more amines selected from the group consisting of: protonized primary ($C_{12}$–$C_{22}$) alkyl amines, protonized secondary ($C_{14}$–$C_{28}$) alkyl amines, protonized secondary ($C_{14}$–$C_{28}$) alkyl diamines, protonized tertiary ($C_8$–$C30$) alkyl amine, quaternary hydroxyalkyl($C_{14}$–$C_{28}$)ammonium compounds and quaternary ammonium compounds having at least one moiety selected from the group consisting of chlorine, COO—, (OH) CH (CHO), COO—, —$SO_4$, —$SO_3$, —CH(OH)COOY, $CH_3$COO—, hydroxyalkyl (OH) COO—, and —NCH(OH)(CHO), Cl$^-$, Br$^-$, and mixtures thereof.

8. A process according to claim 1, wherein said process lasts for an average time in the range of from 1 to 60 minutes.

9. A process according to claim 1 wherein said coagulant is selected from the group consisting of: aluminum oxy sulfate, hydroxyaluminumchloride, chlorosulfate, polyaluminum chloride, hydroxyaluminum sulfate, hydroxyaluminum silicosulfate, or chlorosilicate hydroxyaluminum magnesium chloride, calcium chloride, hydroxyaluminum magnesium sulfate, hydroxyferric chloride, ferric chlorosulfate, combinations of one or more of said coagulant with calcium chloride, mixtures of one or more of said coagulant with magnesium chloride, and fuller's earth absorbent additives.

10. A process according to claim 9 wherein said earth adsorbent additives are selected from the group consisting of: aluminum silicates, calcium aluminum silicates, magnesium silicates, calcium silicates, calcium magnesium silicates, and mixtures thereof.

11. A process according to claim 1 wherein said alkaline compound is selected from the group consisting of: calcium hydroxide, calcium oxide, calcium carbonate, calcium aluminate, sodium aluminate, zinc aluminate, sodium silicate or metasilicte, and sodium hydroxide and mixtures thereof.

12. A process according to claim 1 wherein said organic modified clay comprises one or more clays reacted with one or more amines selected from the group consisting of: protonized primary ($C_{12}$–$C_{22}$) alkyl amines, protonized secondary ($C_{14}$–$C_{28}$) alkyl amines, protonized secondary ($C_{14}$–C28) alkyl diamines, protonized tertiary ($C_8$–$C_{30}$) alkyl amine, quaternary hydroxyalkyl($C_{14}$–$C_{28}$)ammonium compounds and quaternary ammonium compounds having at least one moiety selected from the group comprising chlorine, COO—, (OH) CH (CHO) COO—, —$SO_4$, —$SO_3$, —CH(OH)COOY, $CH_3$COO—, hydroxyalkyl (OH) COO—, —NCH(OH)(CHO),$Cl^-$ or, $Br^{31}$ and mixtures thereof.

13. A process according to claim 12 wherein said one or more clays is selected from the group consisting of: silica vulco clays, hectorite clays, sodium bentonite clays calcium bentonite, fuller's earth clays, aluminum siliceous clays and mixtures thereof.

14. A process according to claim 12 wherein said organic modified clays are mixed with a cellulose selected from the group consisting of: modified cellulose fibers, hydrophobic brown celluloses, natural cellulose fiber adipoguanamine silicone surface modified celluloses, polymethylene urea silicone surface modified celluloses, calcium sulfate hemihydrate and mixtures thereof.

15. A process according to claim 14 wherein said modified cellulose fiber comprises cellulose (38%), lignin (18%), pectin (33%) and protein substances (11%).

16. A process according to claim 1 wherein said flocculant is a polyelectrolyte flocculant selected from the group consisting of: cationic polyelectrolytes, anionic polyelectrolytes, nonionic polyelectrolytes, and mixtures thereof.

17. A process according to claim 1 which further comprises the step of treating said water with a member compound selected from the group consisting of: activated carbon, charcoal, lignin and mixtures thereof.

18. An improved process for the decontamination and deodorization of wastewaters selected from the group consisting of: livestock wastewaters, slaughterhouses waste waters, and livestock lagoon water streams, which process comprises the following steps:

(a) adding to the waste waters a composition comprising a sufficient amount of an acid to lower the water pH to 3.0 or less than 3.0; wherein said acid is selected from the group consisting of: a 1,3,5-Triazine-2,4,6-(1H,3H, 5H)-hydroxyalkyltriglyoxilic acid of the formula

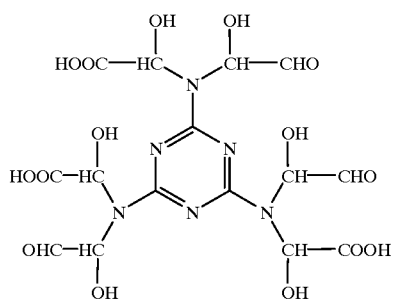

2,2-ether diglycolic acid; sulfamic acid; biscarboxymethyl-ether, glacial acetic acid, glycolic acid, inorganic acids, and mixtures thereof;

(b) mixing to get uniform pH throughout the water;
(c) adding to said water a sufficient amount of a compound selected from the group consisting of: aluminum oxysulfate, aluminum sulfate, hydroxyaluminumchlorosulfate and ferricdichloro-sulfate; hydroxyaluminumchloride, hydroxyaluminum chlorosilicate
(d) adding to said water a sufficient amount of calcium chloride;
(e) mixing thoroughly to produce coagulated solids;
(f) separating said coagulated solids from said water by a method selected from the group consisting of filtration, and air flotation;
(g) mixing in said water a sufficient amount an alkaline additive to bring the pH to a range of 10 to 11.5;
(h) mixing in said water a water soluble amine selected from the group consisting of water soluble polyamino guanidine and water soluble polyamino melamine;
(i) mixing in said water an acid to achieve a pH of 7–8 to produce solids;
(j) separating out from said water the solids formed by filtration, or gravity separation to clarify said water;
(k) mixing in said water an organic modified clay made by reacting a clay with an amine selected from the group consisting of: protonized primary amines, protonized secondary amines, protonized tertiary amines, quaternary ammonium compounds, and mixtures thereof;
(l) mixing in said water calcium aluminum magnesium silicate;
(m) optionally adding to said water at least one flocculant to form a flock, wherein said flocculant is selected from the group of anionic flocculants, cationic flocculants, and nonionic flocculants; and
(n) separating out said flock from contaminant-free water by a process selected from the group consisting of filtering, and gravity separation.

* * * * *